(No Model.)
E. PRAEGER.
YARDSTICK CALCULATOR.
No. 566,867.  Patented Sept. 1, 1896.
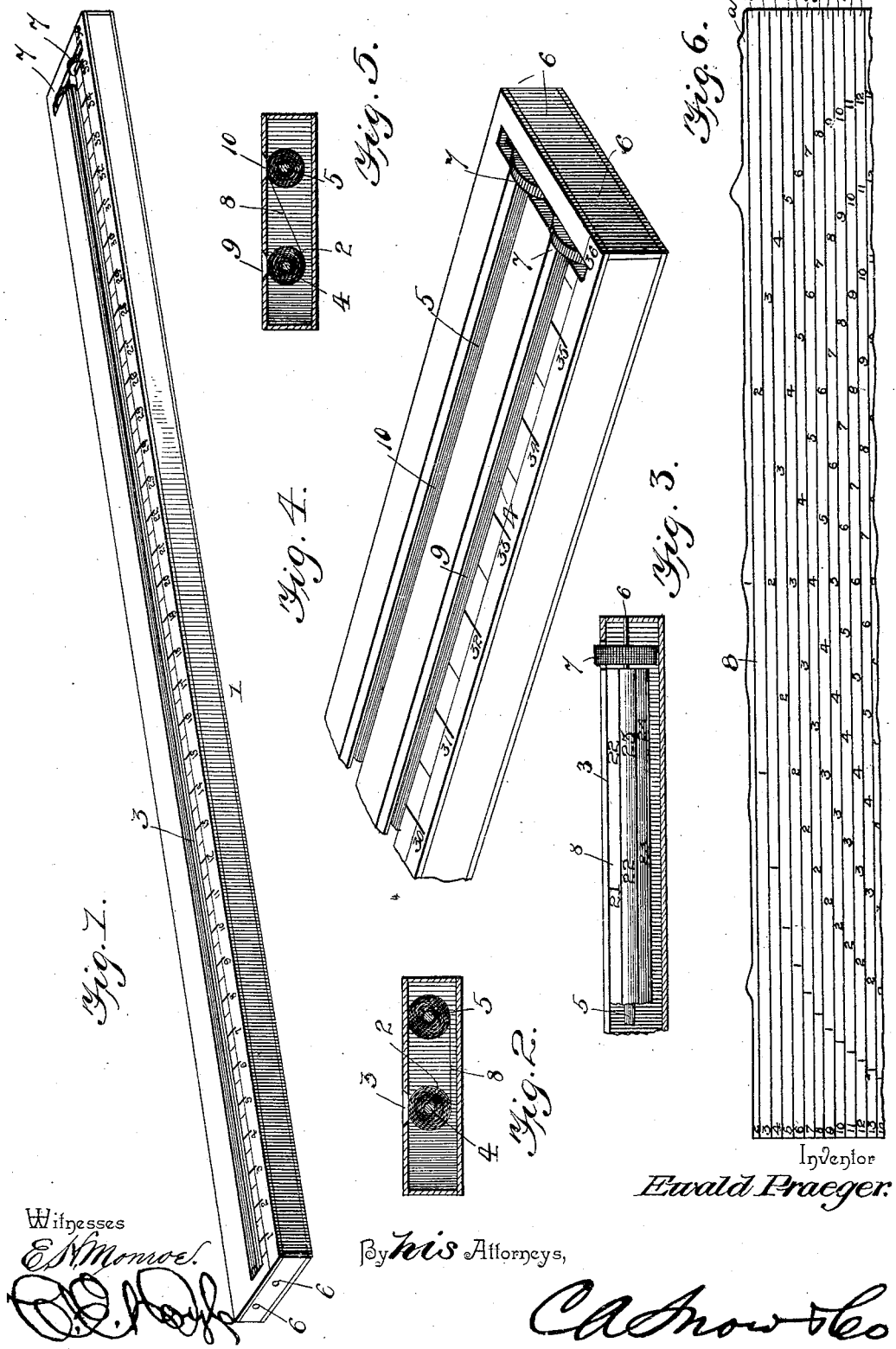
Witnesses
E. N. Monroe.
Inventor
Ewald Praeger.
By his Attorneys,
C. A. Snow & Co.

UNITED STATES PATENT OFFICE.

EWALD PRAEGER, OF SAN ANTONIO, TEXAS.

YARDSTICK-CALCULATOR.

SPECIFICATION forming part of Letters Patent No. 566,867, dated September 1, 1896.

Application filed November 29, 1895. Serial No. 570,515. (No model.)

*To all whom it may concern:*

Be it known that I, EWALD PRAEGER, a citizen of the United States, residing at San Antonio, in the county of Bexar and State of Texas, have invented a new and useful Yardstick-Calculator, of which the following is a specification.

My invention relates to a calculating-yardstick adapted for use in connection with the dry goods or any other business in which goods are sold by linear measurement, the object in view being to provide, in connection with a linear measuring scale or rule, an indicating device provided with a plurality of price-scales having relation to the measuring-scale and adapted to indicate the price of a given length of an article at a given price per unit of measure, and also adapted to indicate the length of an article of a given price which may be sold for a given amount.

Further objects and advantages of this invention will appear in the following description, and the novel features thereof will be particularly pointed out in the appended claims.

In the drawings, Figure 1 is a perspective view of a measuring device constructed in accordance with my invention. Fig. 2 is a transverse sectional view of the same. Fig. 3 is a partial longitudinal section. Fig. 4 is a perspective view of a portion of a measuring device, showing a slightly-modified construction. Fig. 5 is a transverse section of the device shown in Fig. 4. Fig. 6 is a plan view of a portion of the adjustable indicator.

The same numerals of reference indicate the same or corresponding parts in all the figures of the drawings.

1 designates a measuring scale or rule, which, in the construction illustrated, consists of a yardstick recessed to form a hollow case, in the cavity or interior of which is arranged an indicating device 2. In one of the longitudinal walls of the hollow casing, contiguous to the measuring scale or rule, is formed an inspection-slot 3, through which the indicating device may be viewed, and whereby the numerals on said indicating device, which represent different prices per yard or other unit of measurement, may be brought contiguous to the measuring scale or rule.

In the construction illustrated in Figs. 1 to 3, inclusive, the indicating device consists of rollers or drums 4 and 5, mounted at their extremities in bearings 6 in the end walls of the casing and provided contiguous to the end walls with milled thumb-wheels 7, or other means for turning the rolls or drums, said thumb-wheels projecting through short transverse slots in the upper side of the casing and extending sufficiently above the outer surface of the casing to enable them to be moved by sliding a finger transversely across the surface of the casing. To these rolls or drums are secured the opposite edges of a continuous web 8, provided upon one or both surfaces with a plurality of parallel longitudinal lines, between which are arranged numerals in progressive order and disposed at different intervals in the different spaces. Either one of the price-scales thus formed between two contiguous parallel lines on the webbing may be exposed through the inspection-slot in the casing adjacent to the linear measuring-scale, the opposite edges of the web being reeled upon either roller or drum, as necessary to bring the required price-scale into view.

Various systems of arranging the numerals in the several price-scales may be adopted, but that which I have shown in the drawings is as follows: In Fig. 6 I have shown a plurality of different scales designated *a b c*, &c., and located, respectively, between contiguous parallel lines, whereby contiguous scales are distinguishably separated. Each scale is prepared for a given price per yard, and the yard is divided into a number of intervals corresponding with the units of currency in that price. For instance, a scale prepared for articles sold at twelve cents a yard is formed by dividing a yard represented by the length of the web shown in Fig. 6 into twelve equal intervals, the intervals being distinguished by numerals from "1" to "11," arranged progressively or consecutively upon the webbing between two contiguous parallel lines, as shown at *f*. Thus the length of a yard is divided into twelve equal spaces, and the length of an article, of which the price is twelve cents per yard, equal to one of these spaces, or equal to the interval between two consecutive numerals in the scale, is worth one cent. Thus when eight cents' worth of an article of which the price is twelve cents per yard is to be sold the length of that article at the given price will be designated by the mark upon the measuring scale or rule opposite the numeral "8" on the price-scale, or from the left-hand end of the scale 1 to the numeral "8." In the same way, if a length of an article at a given price, as, for instance, twelve cents per yard, is required, said length being less than a yard, as one-half a yard, the desired length of the article will be indicated by the numeral "6" on the price-scale. In the same way a price-scale prepared for articles sold at fifteen cents per yard is formed by dividing the length of the yard into fifteen equal parts designated, respectively, by numerals arranged progressively in the space between two contiguous parallel lines on the web, and by bringing the desired price-scale into view through the inspection-slot in the casing of the rule the desired length of an article for a given amount which is sold at a designated price per yard and the price of an article measuring less than a yard at a given rate per yard may be determined without calculation.

In the modified form of my invention, which is illustrated in Figs. 4 and 5, the price-indicating web is reeled in opposite directions upon the two rolls or drums, and both sides or surfaces of the web are utilized for price-scales, thus multiplying the number of scales which it is possible to employ in connection with a yardstick. When both sides of the web are provided with price-indicating scales, it is necessary to employ a longitudinal slot for each roll or drum, as indicated at 9 and 10, respectively, in Figs. 4 and 5.

Various changes in the form, proportion, and the minor details of construction may be resorted to without departing from the spirit or sacrificing any of the advantages of this invention.

Having described my invention, what I claim is—

1. A linear measuring device or rule comprising a hollow bar, and a price-indicating device having parallel longitudinally-disposed rolls or drums approximately equal in length with the bar and a continuous web secured at its opposite edges to the rolls or drums and provided with a plurality of price-indicating scales arranged in accordance with different prices per unit of measurement and disposed parallel with the linear measuring device, either price-scale being adapted to be exposed by the rotation of the rolls or drums, substantially as specified.

2. A linear measuring device or rule comprising a hollow bar and provided contiguous to its measuring-scale with a longitudinal inspection-slot, a price-indicator arranged within the bar and consisting of parallel longitudinally-disposed rolls or drums approximately equal in length with the bar and a connecting flexible web secured at its opposite edges, respectively, to the rolls or drums, said web carrying a plurality of price-indicating scales prepared in accordance with different prices per unit of linear measurement and disposed parallel with the rolls or drums whereby either price-scale may be exposed through said inspection-slot, and means for adjusting the rolls to expose the desired price-scale, substantially as specified.

3. A linear measuring device or rule having a hollow bar, a price-indicating device consisting of parallel rollers or drums mounted in the cavity of the bar and connected by a continuous flexible web bearing price-scales, either of which may be exposed through an inspection-slot in one wall of the casing, and means for turning the rolls or drums to expose the desired price-scale, said means consisting of thumb-wheels 7 fixed to the rolls or drums and exposed at their upper sides through transverse slots in a wall of the casing, substantially as specified.

In testimony that I claim the foregoing as my own I have hereto affixed my signature in the presence of two witnesses.

EWALD PRAEGER.

Witnesses:
E. C. REICH,
J. W. RICHARDSON.